(12) United States Patent
Kakui et al.

(10) Patent No.: US 6,538,807 B2
(45) Date of Patent: Mar. 25, 2003

(54) AMPLIFICATION OPTICAL FIBER, FIBER OPTIC AMPLIFIER, OPTICAL TRANSMITTER, AND OPTICAL COMMUNICATION SYSTEM

(75) Inventors: Motoki Kakui, Yokohama (JP); Masahiro Takagi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 25 days.

(21) Appl. No.: 09/947,354

(22) Filed: Sep. 7, 2001

(65) Prior Publication Data

US 2002/0033998 A1 Mar. 21, 2002

(30) Foreign Application Priority Data

Sep. 7, 2000 (JP) .......................... 2000-271983

(51) Int. Cl.[7] ................................ H01S 3/00
(52) U.S. Cl. ........................ 359/341.5; 372/6
(58) Field of Search ................ 359/341.5, 180; 372/6

(56) References Cited

U.S. PATENT DOCUMENTS 6,175,445 B1 * 1/2001 Desthieux et al. .......... 359/341
6,483,973 B1 * 11/2002 Mazzarese et al. ......... 385/123

FOREIGN PATENT DOCUMENTS

JP       411103111 A   *  4/1999
JP       02002168384 A *  5/2002

OTHER PUBLICATIONS

"Fiber Optic Test and Measurement", Hewlett Packard Professional Books, p. 238, Chapter 6.
Y. Tashiro et al., "High Output Polarization Maintaining Dispersion Shifted EDFA", Optotechnology Laboratory, p. 330 (w/English Translation).
K. Izoe et al., "Polarization–maintaining Erbium–doped Optical Fiber for 980nm Pumping", Optics and Electronics Laboratory, p. 205 (w/English Translation).
M. Kakui et al., "Polarization–mainting Erbium–doped fiber amplifier operating over long–wavelength band" (w/English Translation).

* cited by examiner

Primary Examiner—Mark Hellner
(74) Attorney, Agent, or Firm—McDermott, Will & Emery

(57) ABSTRACT

This invention relates to an amplification optical fiber which requires no gain equalizer and has a flat gain spectrum and high polarization extinction ratio, and the like. The amplification optical fiber has a core region included in a light propagation region through which signals having different wavelengths propagate, a cladding region around the core region, and a polarization maintaining structure for maintaining the polarized states of the signals. The amplification optical fiber is mainly comprised of silica glass, and Er and Al of 4 wt % or more are doped into at least part of the light propagation region including the core region.

12 Claims, 9 Drawing Sheets

Fig.3

| EDF NUMBER | UNIT | EDF-1 | EDF-2 | EDF-3 |
|---|---|---|---|---|
| CORE DIAMETER | μm | 3.6 | 2.5 | 4.0 |
| RELATIVE REFRACTIVE INDEX DIFFERENCE | % | 1.5 | 1.1 | 1.1 |
| CUTOFF WAVELENGTH | μm | 1.25 | 0.95 | 1.31 |
| Er- AND Al-DOPED REGION | - | 1/2 OF CORE | ENTIRE CORE REGION | ENTIRE CORE REGION |
| MFD AT WAVELENGTH OF 1.55 μm | μm | 4.8 | 7.0 | 6.0 |
| AL CONCENTRATION | wt% | ~1 | 5 | 4 |
| UNSATURATED ABSORPTION PEAK | dB/m | 8.5 | 7.1 | 14.3 |
| POLARIZATION EXTINCTION RATIO (SAMPLE LENGTH) | dB | 27 (WAVELENGTH 1550nm) | 34 (WAVELENGTH 1625nm) | 32.9 (WAVELENGTH 1620nm) |
| | m | 2 | 20 | 20 |

AMPLIFICATION OPTICAL FIBER, FIBER OPTIC AMPLIFIER, OPTICAL TRANSMITTER, AND OPTICAL COMMUNICATION SYSTEM

BACKGROUND OF THE INVENTION

1. Field of the Invention

The present invention relates to an amplification optical fiber for amplifying signals of a plurality of channels, a fiber optic amplifier including the amplification optical fiber, an optical transmitter including the fiber optic amplifier, and an optical communication system including the optical transmitter.

2. Related Background Art

A fiber optic amplifier is an optical device for amplifying multiplexed signals (WDM signals) of a plurality of channels with different wavelengths at once through an amplification optical fiber to which pumping light is supplied in WDM (Wavelength Division Multiplexing) transmission, and is provided in an optical transmitter, relay device, or optical receiver in an optical communication system. As a general amplification optical fiber, a silica-based optical fiber (EDF: Erbium-Doped Fiber) having a core region doped with Er is known. A fiber optic amplifier (EDFA: Erbium-Doped Fiber optic Amplifier) using such an EDF as an amplification optical fiber amplifies signals in the C band (wavelength band: 1,530 to 1,560 nm) or L band (wavelength band: 1,570 to 1,600 nm) using pumping light having a wavelength of 980 nm or 1,480 nm.

An EDFA for amplifying C-band signals is described in, e.g., reference 1 "Tashiro et al., "High-Power constant polarization mode dispersion-shifted Er-doped optical fiber amplifier", 1996, IEICE General Conference, C-330" or reference 2 "Izoe et al., "980 nm Pumping Polarization Holding Er-Doped Optical Fiber", 2000, IEICE General Conference, C-3-26". Each of the EDFAs described in these references uses, as an amplification optical fiber, an EDF having a polarization maintaining structure for maintaining the polarized state of propagated light and amplifies C-band signals without changing the polarized state. The core region of the EDF described in reference 1 is doped not only with erbium (Er) at a concentration of 244 ppm but also with aluminum (Al) at a concentration of 600 ppm. The core region of the EDF described in reference 2 is doped not only with Er at a concentration of 1,210 wt.ppm but also with Al at a concentration of 11,600 wt.ppm.

Such an EDFA for amplifying signals while keeping the polarized state unchanged is arranged in, e.g., an optical transmitter which sets and outputs WDM signals of a plurality of channels in one of two polarized states that are orthogonal to each other. In this case, the EDFA is used to compensate for a transmission loss in a dispersion compensator in the optical transmitter, and the necessary gain is generally relatively as small as about 15 dB. Even when the EDFA has wavelength dependence of the gain (gain uniformity), the levels of WDM signals output from the optical transmitter are adjusted to a predetermined level by adjusting the output levels of light sources for outputting the signals of the channels. Hence, a gain equalizer is not always needed.

SUMMARY OF THE INVENTION

The present inventors examined the above-described prior arts and found the following problem. In the conventional optical transmitter, the output level of a general DFB-LD (Distributed FeedBack Laser Diode) used as a light source is adjusted by adjusting the supplied current value, though the output waveform changes simultaneously. In D-WDM (Dense Wavelength Division Multiplexing) transmission, the allowable variation width of a signal wavelength per channel is generally 0.1 nm, and a corresponding adjustable width of the output level of a DFB-LD is 2 dB.

Hence, in such D-WDM transmission, an EDFA installed in an optical transmitter preferably has a small gain uniformity (a sufficient gain spectrum flatness is ensured in the use wavelength band) and more preferably has a gain uniformity of 2 dB or less. In this case, a gain equalizer must be arranged in the EDFA. However, a gain equalizer having a polarization maintaining function is expensive and also degrades the polarization extinction ratio.

The present invention has been made to solve the above-described problem, and has as its object to provide an amplification optical fiber (EDF) which requires no gain equalizer and has a small gain uniformity (flat gain spectrum) between signal channels and high polarization extinction ratio, a fiber optic amplifier (EDFA) including the amplification optical fiber, an optical transmitter including the fiber optic amplifier, and an optical communication system including the optical transmitter.

An amplification optical fiber according to the present invention is a silica-based optical fiber for amplifying WDM signals of a plurality of channels with different wavelengths at once upon receiving pumping light. The amplification optical fiber has a polarization maintaining structure for maintaining the polarized state of signals. In addition, erbium (Er) and aluminum (Al) at a concentration of 4 wt % or more are doped into at least part of the light propagation region through which the signals propagate. A fiber optic amplifier according to he present invention comprises the amplification optical fiber (amplification optical fiber according to the present invention) for amplifying signals upon receiving pumping light, and a pumping light source for supplying the pumping light to the amplification optical fiber. When pumping light (the wavelength is, e.g., 1,480 or 980 nm) is supplied to the amplification optical fiber, signals (e.g., C band or L band) input to the amplification optical fiber are amplified while keeping their polarized state.

The amplification optical fiber applied to the fiber optic amplifier according to the present invention has a polarization maintaining structure and also a structure in which Er and Al at a concentration of 4 wt % or more are doped into at least part of the core region included in the light propagation region. For this reason, a flat gain spectrum and high polarization extinction ratio can be obtained without using a gain equalizer. In addition, since this amplification optical fiber requires no gain equalizer, the manufacturing cost can be reduced.

The amplification optical fiber according to the present invention preferably has a cutoff wavelength of 1.15 $\mu$m or more. The fiber optic amplifier according to the present invention preferably amplifies signals with wavelengths included in the L band by the amplification optical fiber. In this case, even when the amplification optical fiber is wound in a coil shape and accommodated, the bending loss of the amplification optical fiber falls within the allowable range. Hence, even when the amplification optical fiber becomes long to amplify L-band signals, the fiber optic amplifier can be made compact, and any increase in bending loss can be effectively suppressed.

In the fiber optic amplifier according to the present invention, the polarization extinction ratio at a wavelength of 1.60 μm (1,600 nm) is preferably 20 dB or more, and more preferably, 25 dB or more.

An optical transmitter according to the present invention comprises a first light source system for outputting signals of a plurality of channels with different wavelengths, each signal being set in a first polarized state, and a second light source system for outputting signals of a plurality of channels with wavelengths different from those of the signals output from the first light source system, each signal being set in a second polarized state different from the first polarized state. Especially, the signal channels output from the optical transmitter are sequentially alternately assigned to the first and second light source systems such that the polarized state alternately changes from the short wavelength side to the long wavelength side so as to effectively suppress any nonlinear optical phenomenon such as four wave mixing in the transmission path. The optical transmitter has a multiplexer for multiplexing the signals output from the first and second light source systems while keeping their polarized states unchanged. The optical transmitter also has a fiber optic amplifier having the above-described structure. The fiber optic amplifier may be arranged, e.g., at a position to amplify the signals output from the first and second light source systems at once.

The optical transmitter according to the present invention may have a structure for compensating for chromatic dispersion every channel or every several channels (a dispersion compensation fiber is inserted between the first light source system and the multiplexer). Actually, since the necessary dispersion compensation amount changes for each channel, the length of the dispersion compensation fiber to be installed also changes for each signal channel. However, since the dispersion compensation fiber has a large transmission loss, the signal level difference between a signal channel for which a dispersion compensation fiber is prepared and a signal channel for which no dispersion compensation fiber is prepared increases. To prevent this problem, for the optical transmitter, one or a plurality of fiber optic amplifiers each having the above-described structure may be inserted between the first light source system and the multiplexer for a corresponding signal channel. One or a plurality of fiber optic amplifiers each having the above-described structure may also be inserted between the second light source system and the multiplexer to uniform the signal levels between the signal channels.

An optical communication system according to the present invention comprises an optical transmitter having the above-described structure and transmits WDM signals output from the optical transmitter.

In such an optical communication system, each WDM signal output from the first or second light source system while being set in the first or second polarized state, and is multiplexed. Between the first or second light source system and the multiplexer, to improve the variation in signal level between channels due to dispersion compensation executed for each signal channel, the signals of some channels are amplified by a fiber optic amplifier and output from the optical transmitter. With this arrangement, the signal levels between the signal channels output from the optical transmitter can be uniformed. In addition, since the WDM signals output from the first and second light source systems are set in the two polarized states that are orthogonal to each other, any nonlinear optical phenomenon during propagation through the fiber transmission path can be effectively suppressed, and the wave spacing between the WDM signals can be reduced (the signal transmission amount can be increased). In one of the first and second light source systems, the signals of some channels are amplified by a fiber optic amplifier having a flat gain spectrum and high polarization extinction ratio, and the variation in gain between the signal channels can be effectively reduced. Even in respect to this point, the wave spacing between the signal channels can be reduced (the signal transmission amount can be further increased).

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a table showing the specifications of a plurality of types of samples and a comparative example of the amplification optical fiber according to the present invention;

DESCRIPTION OF THE PREFERRED EMBODIMENTS

Figure 1A:
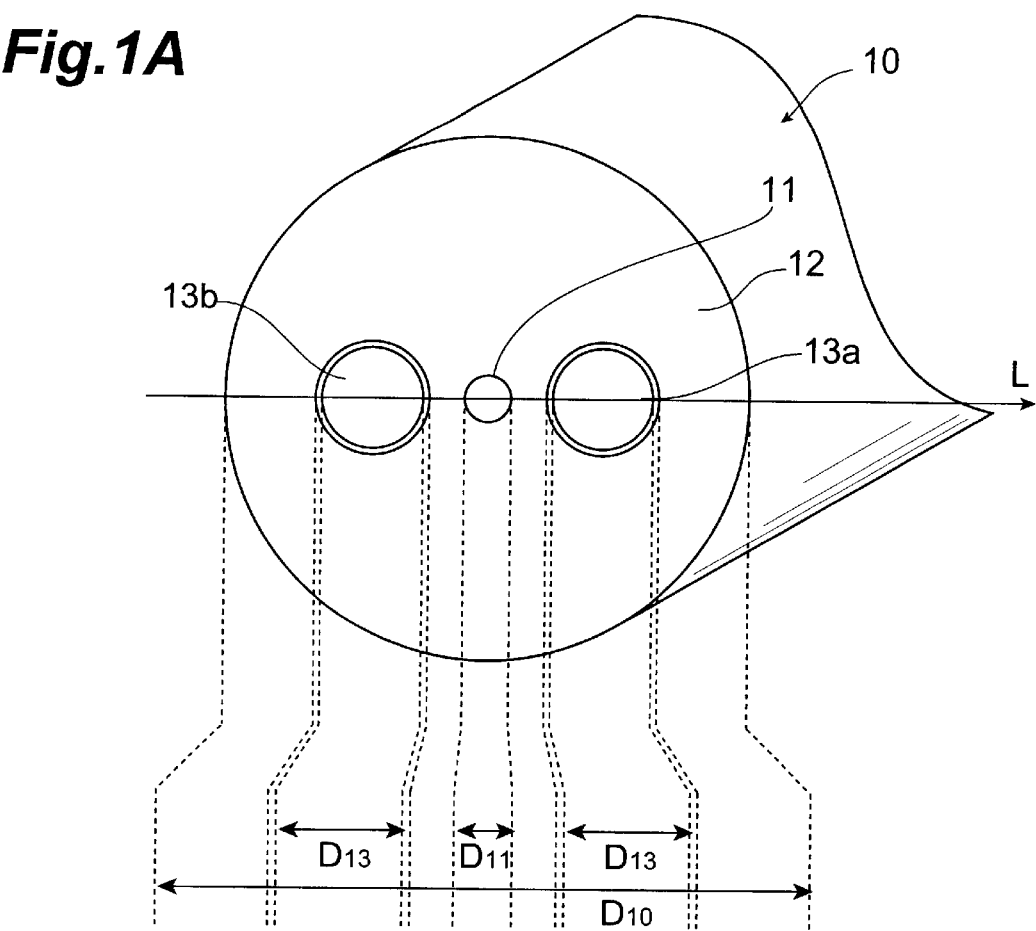
FIG. 1A is a view showing the sectional structure of an amplification optical fiber according to the present invention.

The embodiments of an amplification optical fiber, fiber optic amplifier, optical transmitter, and optical communication system according to the present invention will be described below in detail with reference to FIGS. 1A, 1B, and 2 to 9. The same reference numerals denote the same element throughout the drawings, and a repetitive description thereof will be omitted.

Figure 1B:
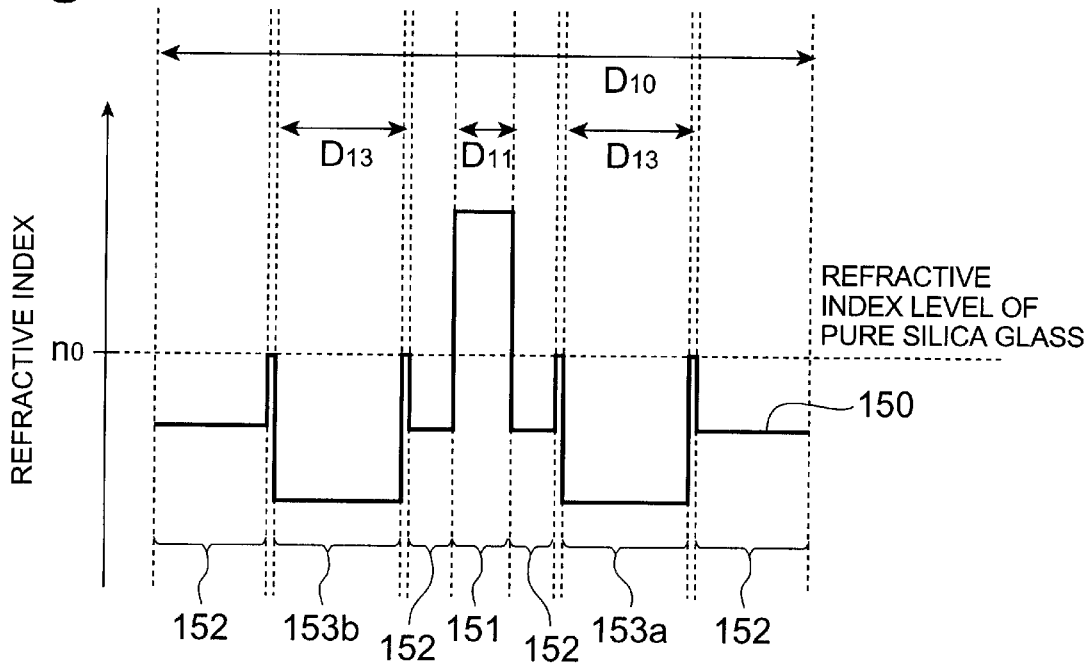
FIG. 1B is a view showing the index profile of the amplification optical fiber.

FIG. 1A is a view showing the sectional structure of an EDF 10, i.e., an amplification optical fiber according to the present invention. FIG. 1B is a view showing the index profile of the EDF 10. The EDF 10 contains silica glass as a main component and has a core region 11 extending along a predetermined axis and a cladding region 12 surrounding the core region 11 and also has a polarization maintaining structure for maintaining the polarized state of signals propagating.

As polarization maintaining structures applicable to an optical fiber, a Panda type, Bow tie type, Oval core type, and Elliptical stress member type are known, as indicated by, e.g., "FIBER OPTIC TEST AND MEASUREMENT", HEWLETT-PACKARD, PROFESSIONAL BOOKS p. 236 (Chapter 6). In this embodiment, an amplification optical fiber using a Panda type polarization maintaining structure will be described. That is, the EDF 10 has two stress applying regions 13a and 13b on both sides of the core region 11, as shown in FIG. 1A. An outer diameter $D_{11}$ of the core region 11 is, e.g., 2.5 to 4.0 μm, an outer diameter $D_{13}$ of each of the stress applying regions 13a and 13b is, e.g., 30 to 35 μm, and an outer diameter $D_{10}$ of the EDF 10 is 125 μm. The EDF 10 is mainly formed from silica glass. Er and Al at a concentration of 4 wt % or more are doped into at least part of the core region 11 included in the light propagation region. F is doped into the cladding region 12, and boron (B) is doped into the stress applying regions 13a and 13b which form the polarization maintaining structure.

Each of the stress applying regions 13a and 13b doped with B has a thermal expansion coefficient larger than that of the core region 11 or cladding region 12 and therefore shrinks after the optical fiber preform drawing process in manufacturing the EDF 10. As a result of this shrink, stress that pulls the core region 11 in a direction to connect the stress applying regions 13a and 13b remains, and stress for compressing the core region 11 in a direction perpendicular to the above direction also remains. Since the stress applying regions 13a and 13b apply different stresses to the core region 11 in two directions perpendicular to the optical axis, birefringence occurs, and the polarized state of light propagating through the EDF 10 is held. That is, the stress applying regions 13a and 13b function to maintain the polarized state of light propagating through the EDF 10.

Increasing the Al concentration and increasing the Ge concentration in the core region 11 are inconsistent requirements in manufacturing the EDF 10. In the EDF 10, to ensure a sufficient relative refractive index difference between the core region 11 and the cladding region 12 without increasing the Ge concentration, F is doped into the cladding region 12. In addition, since the boundaries between the cladding region 12 and the stress applying regions 13a and 13b are formed from pure silica glass, the EDF 10 can be manufactured at a low cost. Letting $n_1$ be the refractive index of the core region 11, and $n_2$ be the refractive index of the cladding region 12, a relative refractive index difference Δ between the core region 11 and the cladding region 12 is given by $$\Delta = (n_1^2 - n_2^2)/2n_2^2 \approx (n_1 - n_2)/n_2$$

FIG. 1B is a view showing an index profile 150 of the EDF 10 shown in FIG. 1A along a line L perpendicular to the optical axis. In the index profile 150, a region 151 represents a refractive index on the line L in the core region 11, a region 152 represents a refractive index on the line L in the cladding region 12, and regions 153a and 153b represent refractive indices on the line L in the stress applying regions 13a and 13b.

In the EDF 10 having the index profile 150, the energy of propagated light concentrates in the core region 11 and also partially concentrates in the stress applying regions 13a and 13b. For this reason, the bending loss of the EDF 10 may be larger than that of a normal EDF having no stress applying region. However, since the energy of light propagating through the EDF 10 can be further concentrated in the core region 11 by making the cutoff wavelength long (e.g., 1.15 μm or more), any increase in bending loss of the EDF 10 is effectively suppressed.

Figure 2:
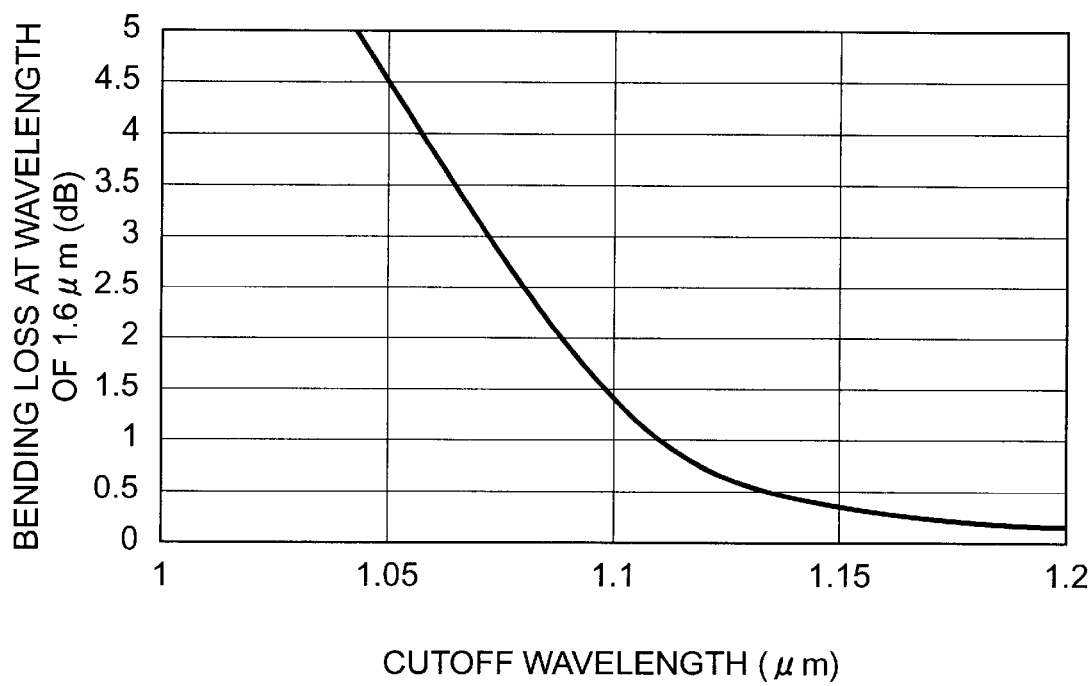
FIG. 2 is a graph showing the bending characteristic of the amplification optical fiber according to the present invention.

FIG. 2 is a graph showing the bending characteristic of the amplification optical fiber (EDF 10) shown in FIGS. 1A and 1B. FIG. 2 shows the relationship between the cutoff wavelength and the bending loss of the EDF 10. The bending loss was measured by winding a 5-m long EDF 10 into a coil shape with a diameter of 35 mm, inputting measurement light with a wavelength of 1,600 nm to the EDF 10 wound in the coil shape, and detecting the difference between the input level and the output level of the measurement light.

As is apparent from the graph, the longer the cutoff wavelength becomes, the smaller the bending loss becomes. If the bending loss of the EDF 10 is 0.5 dB or less, it is almost the same as the insertion loss of other optical components inserted into the EDF. Hence, a bending loss of 0.5 dB or less is allowable. To suppress the bending loss in the allowable range, the cutoff wavelength of the EDF 10 is preferably 1.15 μm or more.

The EDF 10 for amplifying L-band signals must be longer than that for amplifying C-band signals. However, when the cutoff wavelength of the EDF 10 is 1.15 μm or more, any increase in bending loss is suppressed, and therefore, even the EDF 10 for amplifying L-band signals can be accommodated in a small space.

FIG. 3 is a table showing the specifications of samples and a control of the EDF 10, i.e., three amplification optical fibers EDF-1 to EDF-3. In each of the EDF-2 and EDF-3, Er and Al at a concentration of 4 wt % or more are doped into the entire core region included in the light propagation region. The EDF-3 has a cutoff wavelength of 1.15 μm or more, and its bending loss is small. On the other hand, the EDF-1 is a sample prepared for comparison in which Al at a concentration of about 1 wt % is doped into part of the core region (about ½ region). All the EDF-1 to EDF-3 have a Panda-type polarization maintaining structure.

For the control EDF-1, the outer diameter of the core region is 3.6 μm, the relative refractive index difference between the core region and the cladding region is 1.5%, the cutoff wavelength is 1.25 μm, the Er- and Al-doped region is ½ the core region, the mode field diameter (MFD) at a wavelength of 1.55 μm is 4.8 μm, the Er concentration is about 1,600 wt.ppm, the Al concentration is about 1 wt %, the unsaturated absorption peak is 8.5 dB/m, the polarization crosstalk at a wavelength of 1,550 nm is 27 dB, and the sample length is 2 m.

For the EDF-2, the outer diameter of the core region is 2.5 μm, the relative refractive index difference between the core region and the cladding region is 1.1%, the cutoff wavelength is 0.95 μm, the Er- and Al-doped region is the entire core region, the mode field diameter (MFD) at a wavelength of 1.55 μm is 7.0 μm, the Er concentration is about 1,500 wt.ppm, the Al concentration is 5 wt %, the unsaturated absorption peak is 7.1 dB/m, the polarization crosstalk at a wavelength of 1,625 nm is 34 dB, and the sample length is 20 m.

For the EDF-3, the outer diameter of the core region is 4.0 μm, the relative refractive index difference between the core region and the cladding region is 1.1%, the cutoff wavelength is 1.31 μm, the Er- and Al-doped region is the entire core region, the mode field diameter (MFD) at a wavelength of 1.55 μm is 6.0 μm, the Er concentration is 1,000 wt.ppm, the Al concentration is 4 wt %, the unsaturated absorption peak is 14.3 dB/m, the polarization crosstalk at a wavelength of 1,620 nm is 32.9 dB, and the sample length is 20 m.

Figure 4:
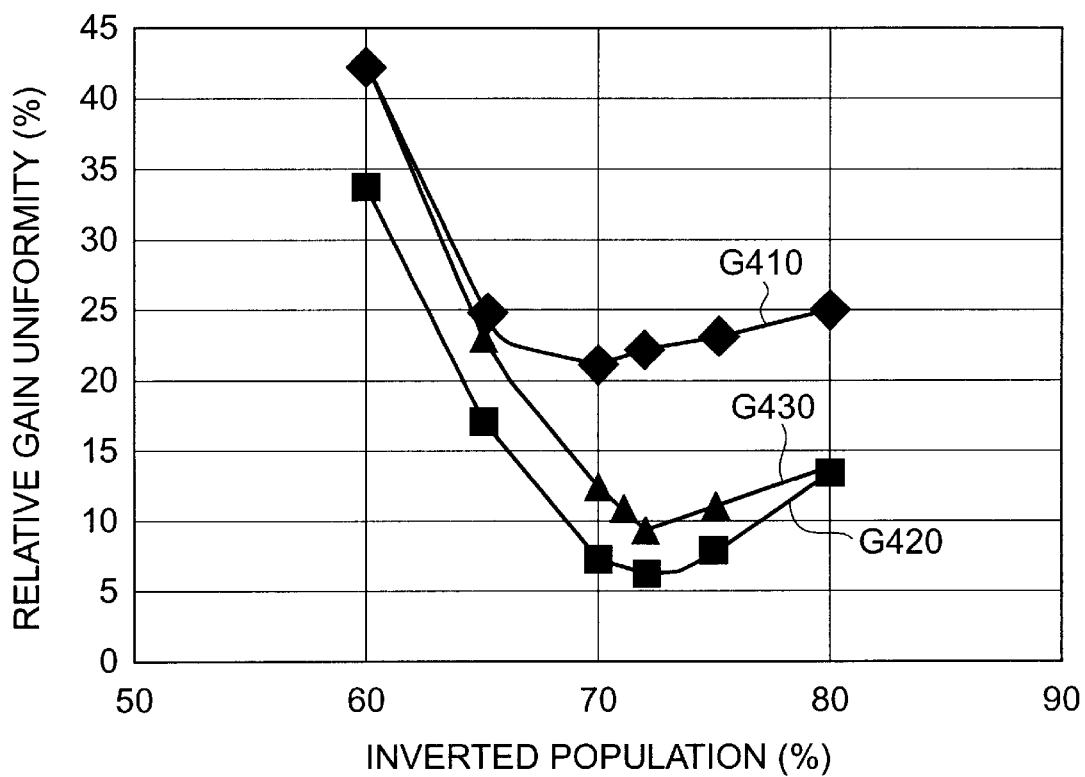
FIG. 4 is a graph showing the relationship between the inverted population and the relative gain uniformity of each sample shown in FIG. 3.

FIG. 4 is a graph showing the relationship between the inverted population and the relative gain uniformity of each of the samples EDF-1 to EDF-3 having the above specifications. Referring to FIG. 4, a graph G410 indicates the measurement result for the sample EDF-1, a graph G420 indicates the measurement result for the sample EDF-2, and a graph G430 indicates the measurement result for the sample EDF-3. The relative gain uniformity is a value obtained by dividing the gain uniformity (dB) in a wavelength band of 1,535 to 1,560 nm by the minimum gain (dB). The gain uniformity means the difference between the maximum and minimum gains of the gain spectrum in the above wavelength band. The band of 1,535 to 1,560 nm is necessary to WDM-transmit signals of 32 channels at an interval of 100 GHz.

As is apparent from the graphs G410 to G430, as the Al concentration becomes high, the relative gain uniformity becomes small independently of the state of inverted population. That is, each of the samples EDF-2 and EDF-3 included in the amplification optical fiber according to the present invention has a gain uniformity smaller than that of the sample EDF-1 as a control.

Figure 5:
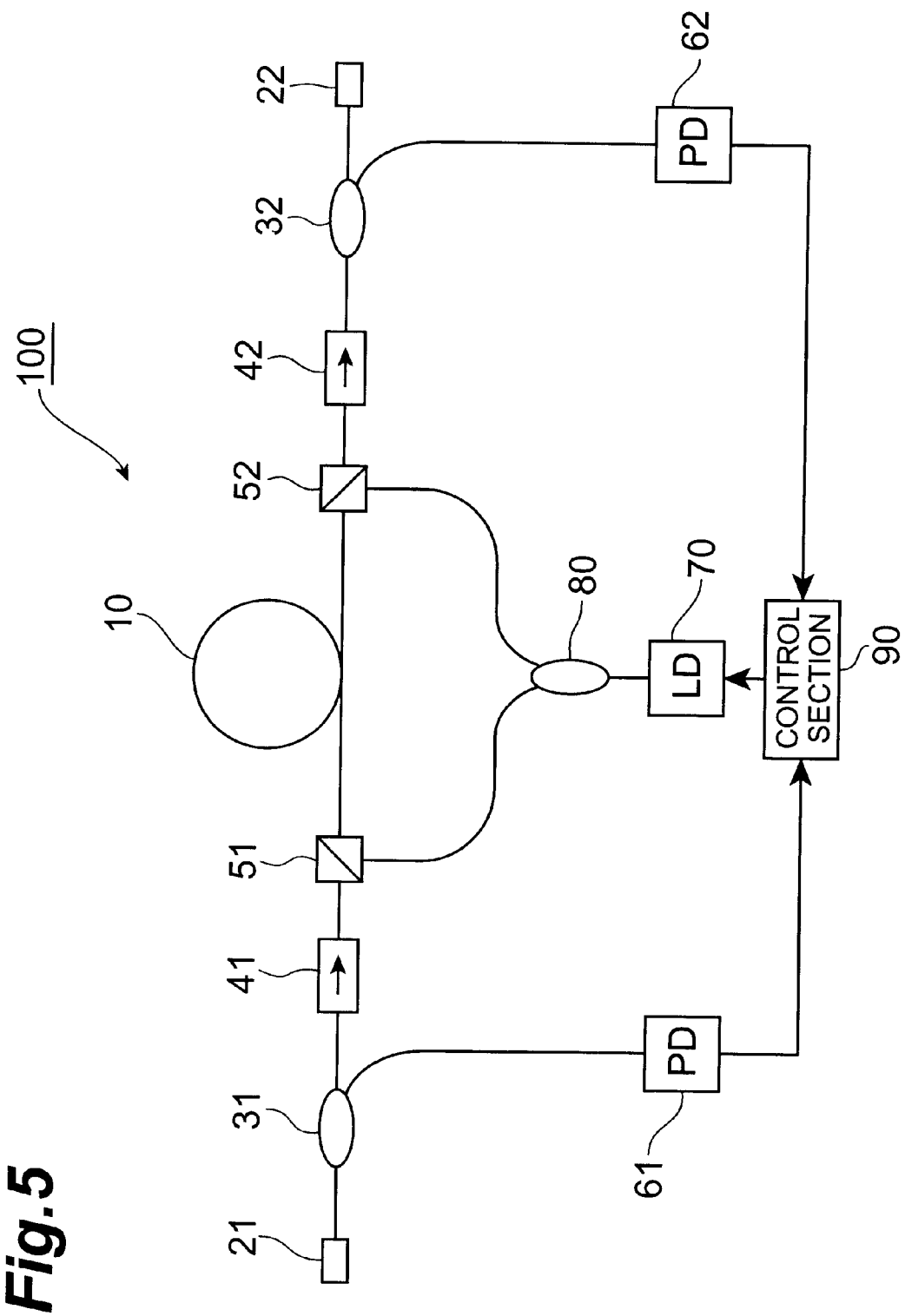
FIG. 5 is a view showing the structure of a fiber optic amplifier according to the present invention.

A fiber optic amplifier according to the present invention will be described next. FIG. 5 is a view showing the structure of a fiber optic amplifier (EDFA 100) according to the present invention. This EDFA 100 comprises a branch coupler 31, optical isolator 41, WDM coupler 51, above-described EDF 10 with a polarization maintaining structure, WDM coupler 52, optical isolator 42, and branch coupler 32, which are sequentially arranged from an input connector 21 to an output connector 22. A light-receiving portion 61 is optically connected to the branch coupler 31. A light-receiving portion 62 is optically connected to the branch coupler 32. A pumping light source 70 is optically connected to the WDM couplers 51 and 52 through a branch coupler 80. The EDFA 100 also has a control section 90 for controlling the power of pumping light to be output from the pumping light source 70.

The branch coupler 31 branches a partial power of light (containing signals) input to the input connector 21 to the light-receiving portion 61 and outputs the remaining power to the optical isolator 41. The optical isolator 41 is an optical device which passes light in the forward direction from the branch coupler 31 to the WDM coupler 51 but not in the reverse direction and includes a polarization-independent crystal. The WDM coupler 51 outputs the signals from the optical isolator 41 to the EDF 10 and also outputs the pumping light from the branch coupler 80 to the EDF 10.

The WDM coupler 52 outputs the signals from the EDF 10 to the optical isolator 42 and also outputs the pumping light from the branch coupler 80 to the EDF 10. The optical isolator 42 is an optical device which passes light in the forward direction from the WDM coupler 52 to the branch coupler 32 but not in the reverse direction and includes a polarization independent crystal. The branch coupler 32 branches some components of light (containing signals) from the optical isolator 42 to the light-receiving portion 62 and outputs the remaining components to the output connector 22.

The light-receiving portion 61 detects the power of the signals from the branch coupler 31 and outputs signals (input level signals) corresponding to the power. The light-receiving portion 62 detects the power of the signals from the branch coupler 32 and outputs signals (output level signals) corresponding to the power. The control section 90 receives the input level signals output from the light-receiving portion 61 and the output level signals output from the light-receiving portion 62 and controls the power of pumping light to be output from the pumping light source 70 on the basis of the pieces of received information. The branch coupler 80 branches the pumping light output from the pumping light source 70 into two components. One of the branched pumping light components is output to the WDM coupler 51, and the other pumping light component is output to the WDM coupler 52.

The EDFA 100 according to the present invention operates in the following manner. Pumping light output from the pumping light source 70 is branched into two components by the pumping light source 70, and the branched pumping light components are supplied to the EDF 10 through the WDM couplers 51 and 52 (bidirectional pumping). Signals input through the input connector 21 sequentially pass through the branch coupler 31, optical isolator 41, and WDM coupler 51 and arrive at the EDF 10. The EDF 10 that has arrived at the EDF 10 is amplified by the EDF 10. The signals amplified by the EDF 10 sequentially pass through the WDM coupler 52, optical isolator 42 and branch coupler 32, and are output from the EDFA 100 through the output connector 22.

Some components of the light input through the input connector 21 are branched by the branch coupler 31 and arrive at the light-receiving portion 61. The light-receiving portion 61 receives the incoming signals and outputs input level signals respectively corresponding to the powers of the signals. In addition, some components of the light to be output through the output connector 22 are branched by the branch coupler 32 and arrive at the light-receiving portion 62. The light-receiving portion 62 receives the incoming signals and outputs output level signals respectively corresponding to the powers of the signals. The control section 90 controls the power of pumping light to be output from the pumping light source 70 on the basis of the input and output level signals such that the gain of the EDFA 100 is kept constant.

A detailed example of the EDFA 100 according to the present invention will he described below. The designed gain of the EDFA 100 is 13 dB. The EDF 10 is the EDF-3 shown in FIG. 3, which has a length of 30 m, an unsaturated absorption peak of 430 dB, and a diameter of 40 mm, and is wound in a coil shape and accommodated. The pumping light source 70 is a DFB-LD for outputting a laser beam having a wavelength of 1,480 nm as pumping light. Each of the WDM couplers 51 and 52 is formed from a filer-type coupler for multiplexing/demultiplexing light components in 1,480- and 1,580-nm wavelength bands. The wavelength band of signals to be amplified by the EDFA 100 is the L band. The loss in signals from the input connector 21 to the EDF 10 is 1.1 dB, and the loss in signals from the EDF 10 to the output connector 22 is 1.3 dB.

When the power of pumping light to be output from the pumping light source 70 is controlled such that the power of the signals to be output from the EDFA 100 becomes constant, the branch coupler 31 and light-receiving portion 61 can be omitted. When the pumping light is supplied from the WDM coupler 51 side to the EDF 10 (forward pumping), the WDM coupler 52 and branch coupler 80 can be omitted. Conversely, when the pumping light is supplied from the WDM coupler 52 side (backward pumping), the WDM coupler 51 and branch coupler 80 can be omitted.

Figure 6A:
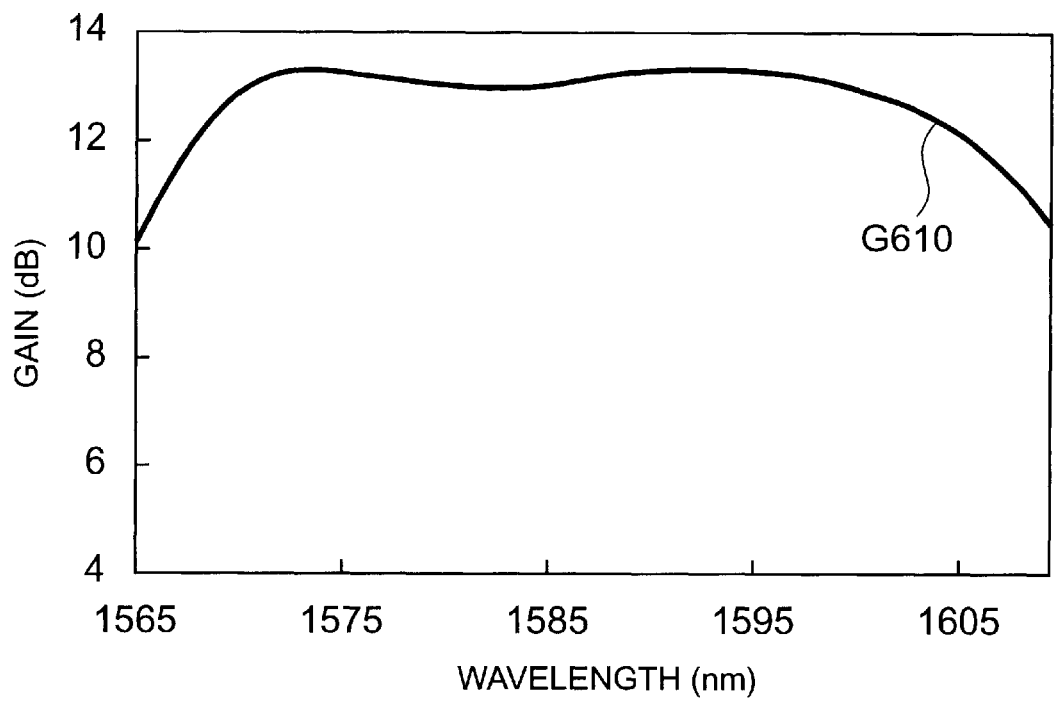
FIGS. 6A and 6B are graphs respectively showing the wavelength dependence of the gain characteristic and the wavelength dependence of the noise factor characteristic of the fiber optic amplifier according to the present invention.
Figure 6B:
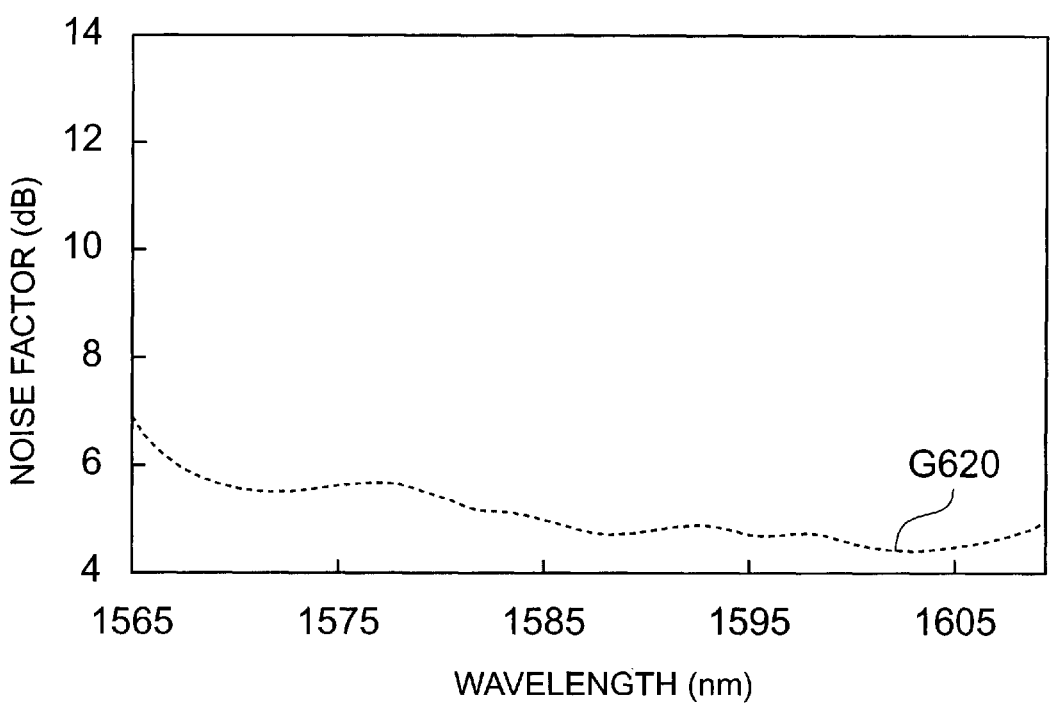

FIGS. 6A and 6B are graphs respectively showing the wavelength dependence of the gain characteristic and the dependence of the noise factor characteristic of the fiber optic amplifier (EDFA 100) shown in FIG. 5. A graph G610 represents the wavelength dependence of the gain characteristic, and a graph G620 represents the wavelength dependence of the noise factor characteristic. As measurement conditions, the power of the signals input from the input connector 21 is +2 dBm, and the power of the signal output from the output connector 22 is +15 dBm (at this time, the power of pumping light output from the pumping light source 70 is 95 mW). As is apparent from this graph, in a wavelength band of 1,572 to 1,602 nm, the gain uniformity is 0.5 dB or less, and the noise factor is 6 dB or less.

Figure 7:
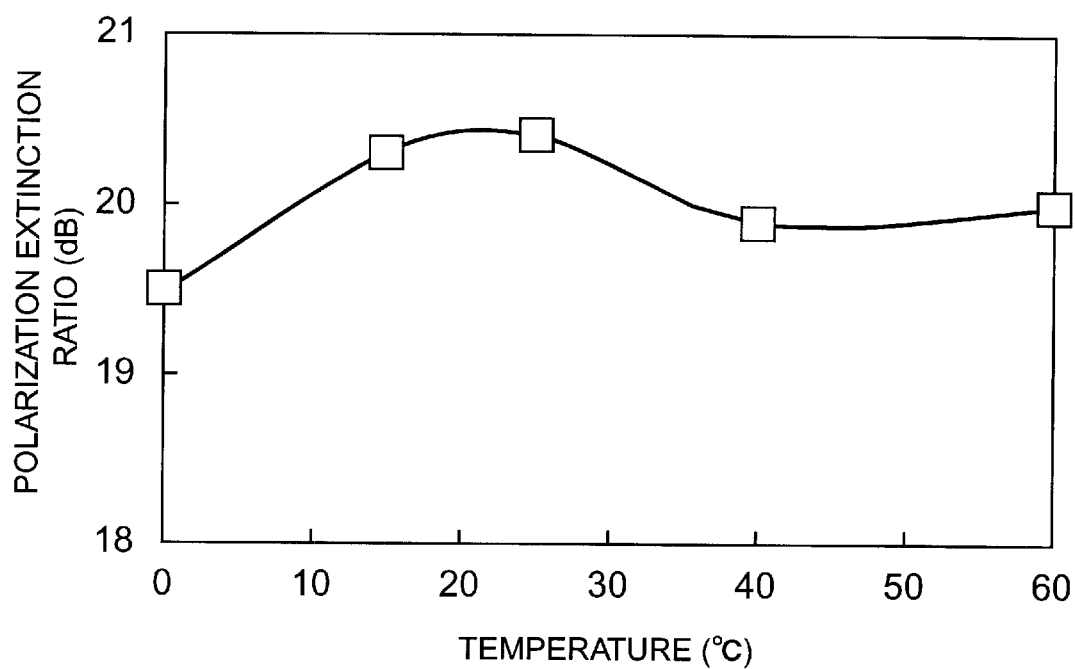
FIG. 7 is a graph showing the temperature dependence of the polarization extinction ratio of the fiber optic amplifier according to the present invention.

FIG. 7 is a graph showing the temperature dependence of the polarization extinction ratio of the fiber optic amplifier (EDFA 100) according to the present invention (measurement result at a wavelength of 1,600 nm). As is apparent from this graph, the polarization extinction ratio within the temperature range of 0° C. to 60° C. is 19.5 to 20.5 dB.

As described above, the EDFA 100 according to the present invention uses, as an amplification optical fiber, the EDF 10 having a polarization maintaining structure, in which Er and Al at a concentration of 4 wt % or more are doped into the core region 11 included in the light propagation region. For this reason, the gain uniformity between signals can be made small (the gain spectrum can be flattened) and the polarization extinction ratio can be made high without using a gain equalizer. The EDFA 100 that requires no gain equalizer can be manufactured at a low cost. In addition, when the EDF 10 having a cutoff wavelength of 1.15 μm or more is used, the EDFA 100 can be made compact. That is, even when the EDF 10 is wound in a coil shape and accommodated, the bending loss of the EDF 10 falls within the allowable range. Additionally, even when the EDF 10 becomes long to amplify L-band signals, any increase in bending loss of the EDF 10 can be effectively suppressed.

Figure 8:
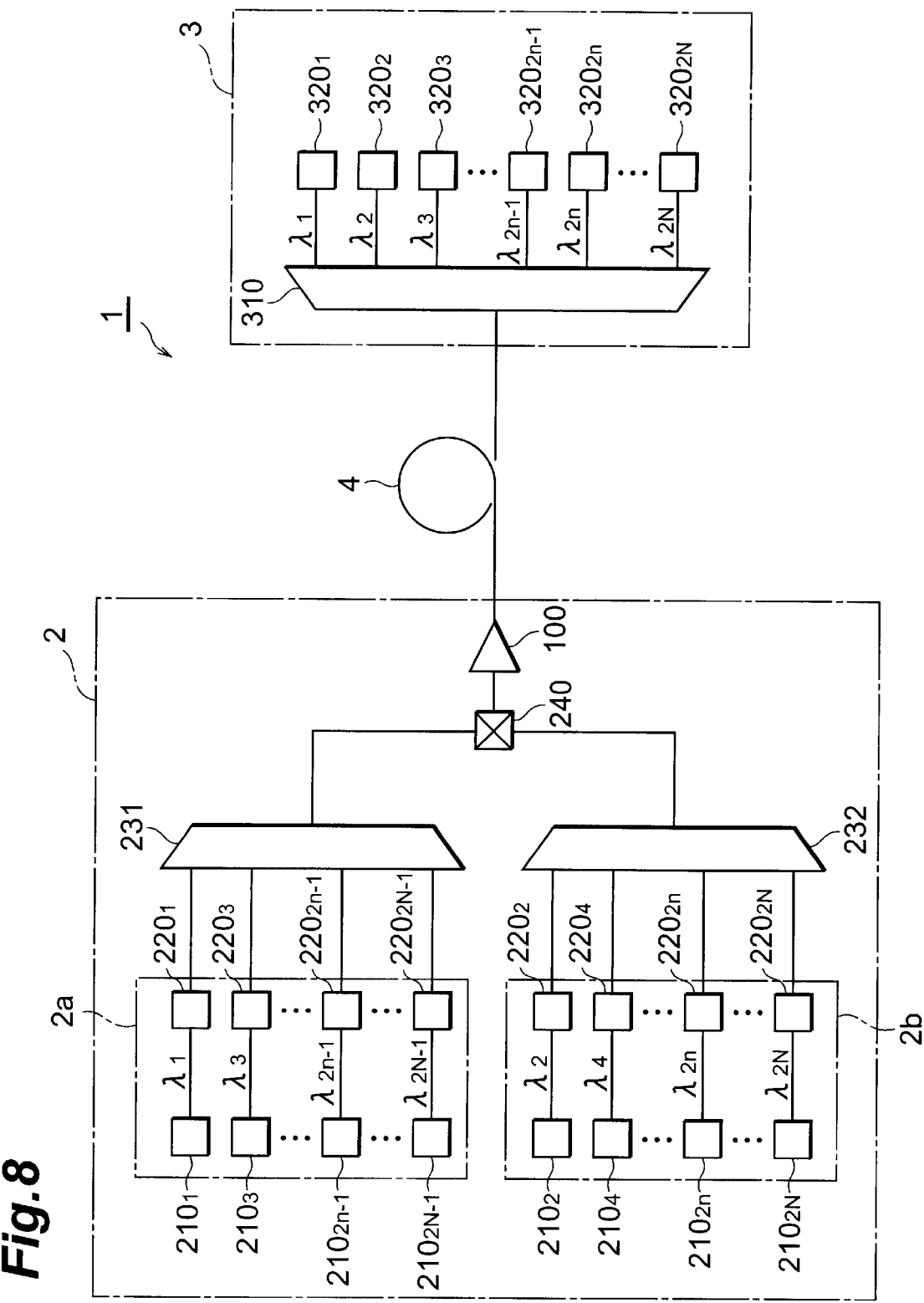
FIG. 8 is a block diagram showing the structure of the first embodiment of an optical communication system according to the present invention (including an optical transmitter according to the present invention)

An optical transmitter according to the present invention and an optical communication system including the optical transmitter will be described next. FIG. 8 is a block diagram showing the structure of the first embodiment of an optical transmitter 2 according to the present invention and an optical communication system 1 including the optical transmitter. For this optical communication system 1, the optical transmitter 2 and optical receiver 3 are optically connected by an optical fiber transmission path 4. A relay device may be arranged on the optical fiber transmission path 4. The optical transmitter 2 comprises 2N (N is a positive integer) light sources 210₁ to 210₂ₙ, 2N optical polarization controllers 220₁ to 220₂ₙ, multiplexers 231 and 232, optical polarization synthesizer 240, and EDFA 100 having the above-described structure. The optical receiver 3 comprises a demultiplexer 310 and 2N receiving portions 320₁ to 320₂ₙ.

Each light source 210$_k$ (k is an arbitrary integer; 1≦k≦2N) outputs signals having a wavelength $\lambda_k$. Wavelengths $\lambda_1$ to $\lambda_{2N}$ belong to the L band and hold a relationship $\lambda_1 < \lambda_2 < \ldots < \lambda_{2n-1} < \lambda_{2n} < \ldots < \lambda_{2N}$. As each light source 210$_k$, a DFB-LD is preferably used. Each optical polarization controller 220$_k$ outputs signals output from a corresponding 210$_k$ as linearly polarized light. The multiplexer 231 multiplexes the signals output from the optical polarization controllers 220₁, 220₃, . . . , 220$_{2n-1}$, . . . , and 220$_{2N-1}$ and outputs the multiplexed signals to the optical polarization synthesizer 240. The multiplexer 232 multiplexes the signals output from the optical polarization controllers 220₂, 220₄, . . . , 220$_{2n}$, . . . , and 220$_{2N}$ and outputs the multiplexed signals to the optical polarization synthesizer 240.

In this embodiment, the light sources 210₁ to 210$_{2N}$ for outputting the signal wavelengths $\lambda_1$ to $\lambda_{2N}$ are sequentially numbered in ascending order of signal wavelength to be output and divided into a first light source system 2a including the odd-numbered light sources 210₁, 210₃, . . . , 210$_{2n-1}$, . . . , and 210$_{2N-1}$ and optical polarization controllers 220₁, 220₃, . . . , 220$_{2n-1}$, . . . , and 220$_{2N-1}$ and a second light source system 2b including the even-numbered light sources 210₂, 210₄, . . . , 210$_{2n}$, . . . , and 210$_{2N}$ and optical polarization controllers 220₂, 220₄, . . . , 220$_{2n}$, . . . , and 220$_{2N}$. The system is designed to make the polarized states of the signals output from the first and second light source systems 2a and 2b orthogonal. Hence, the plane of polarization of the signals ($\lambda_1, \lambda_3, \ldots, \lambda_{2n-1}, \ldots, \lambda_{N-1}$) output from the multiplexer 231 to the optical polarization synthesizer 240 and the plane of polarization of the signals ($\lambda_2, \lambda_3, \ldots, \lambda_{2n}, \ldots, \lambda_N$) output from the multiplexer 232 to the optical polarization synthesizer 240 are orthogonal.

The optical polarization synthesizer 240 multiplexes the signals ($\lambda_1, \lambda_3, \ldots, \lambda_{2n-1}, \ldots, \lambda_{N-1}$) output from the multiplexer 231 and the signals ($\lambda_2, \lambda_3, \ldots, \lambda_{2n}, \ldots, \lambda_N$) output from the multiplexer 232 and outputs the 2N multiplexed signals to the EDFA 100. Even at the time of output from the optical polarization synthesizer 240, the plane of polarization of the signals ($\lambda_1, \lambda_3, \ldots, \lambda_{2n-1}, \ldots, \lambda_{N-1}$) and the plane of polarization of the signals ($\lambda_2, \lambda_3, \ldots, \lambda_{2n}, \ldots, \lambda_N$) are orthogonal. The EDFA 100 amplifies the signals ($\lambda_1$ to $\lambda_{2N}$) of the respective channels output from the optical polarization synthesizer 240 at once and outputs the signals to the optical fiber transmission path 4.

The demultiplexer 310 demultiplexes the signals of the 2n channels propagating through the optical fiber transmission path 4 into the respective wavelengths. Each receiving portion 320$_k$ receives signals having a corresponding wavelength $\lambda_k$ multiplexed by the demultiplexer 310.

The optical communication system 1 according to the first embodiment operates in the following way. In the optical transmitter 2, the signals having the wavelength $\lambda_1$ output from the light source 210$_k$ are converted into linearly polarized light by the optical polarization controller 220$_k$. The signals ($\lambda_1, \lambda_3, \ldots, \lambda_{2n-1}, \ldots, \lambda_{N-1}$) output from the optical polarization controllers 220₁, 220₃, . . . , 220$_{2n-1}$, . . . , and 220$_{2N-1}$ included in the first light source system 2a are multiplexed by the multiplexer 231. On the other hand, the signals ($\lambda_2, \lambda_3, \ldots, \lambda_{2n}, \ldots, \lambda_N$) output from the optical polarization controllers 220₂, 220₄, . . . , 220$_{2n}$, . . . , and 220$_{2N}$ included in the second light source system 2b are multiplexed by the multiplexer 232. These signals ($\lambda_1$ to $\lambda_{2N}$) of 2N channels are further multiplexed by the optical polarization synthesizer 240 and input to the EDFA 100. Of the signals of 2N channels input to the EDFA 100, the plane of polarization of the signals of N channels ($\lambda_1, \lambda_3, \ldots, \lambda_{2n-1}, \ldots, \lambda_{N-1}$) and the plane of polarization of the remaining signals of N channels ($\lambda_2, \lambda_3, \ldots, \lambda_{2n}, \ldots, \lambda_N$) are orthogonal. These signals of 2N channels are amplified by the EDFA 100 and output to the optical fiber transmission path 4 while keeping the polarized states unchanged. In the optical receiver 3, the signals of 2N channels that have arrived through the optical fiber transmission path 4 are demultiplexed into the respective wavelengths by the demultiplexer 310. Each demultiplexed signal having the wavelength $\lambda_1$ is received by the receiving portion 320$_k$ prepared in correspondence with the signals.

As described above, in the optical communication system 1 and optical transmitter 2 according to the first embodiment, 2N channels are set in polarized states orthogonal to each other alternately from the short wavelength side to the long wavelength side, and the signals of N channels are transmitted from the optical transmitter 2 to the optical receiver 3 through the optical fiber transmission path 4. Hence, since any nonlinear optical phenomenon such as four wave mixing or cross phase modulation that may occur when these signals of N channels propagate through the optical fiber transmission path 4 can be effectively suppressed, and the wave spacing between the signal channels can be reduced, the signal transmission amount can be increased. In addition, since the signals of 2N channels are amplified by the EDFA 100 with a small gain uniformity and high polarization extinction ratio, the wave spacing can also be reduced in respect to this point, and the signal transmission amount can be further increased.

In the optical communication system 1, a dispersion compensator (e.g., a dispersion compensation fiber) may be arranged in the optical transmitter 2 to compensate for chromatic dispersion of the optical fiber transmission path 4, and the EDFA 100 may compensate for a loss in signal in the dispersion compensator. The EDFA may be arranged either in the optical receiver 3 or in the relay device inserted between the optical transmitter 2 and the optical receiver 3. When the polarized states of signals are held, the EDFA 100 having the above-described structure is preferably used as the EDFA provided in the optical receiver 3 or relay device. However, if the signals of each channel are set in an unpolarized state through the optical fiber transmission path 4, a normal EDFA can be used.

In the second embodiment of an optical communication system according to the present invention, a dispersion compensation fiber serving as a dispersion compensator is prepared in an optical transmitter 2 for one or a plurality of signal channels, and one or more EDFAs 100 each having the above-described structure are prepared to uniform the signal levels between the signal channels, i.e., flatten the gain spectrum. The EDFA 100 has a small gain uniformity between signal channels and can therefore be used for any signal channel.

Figure 9:
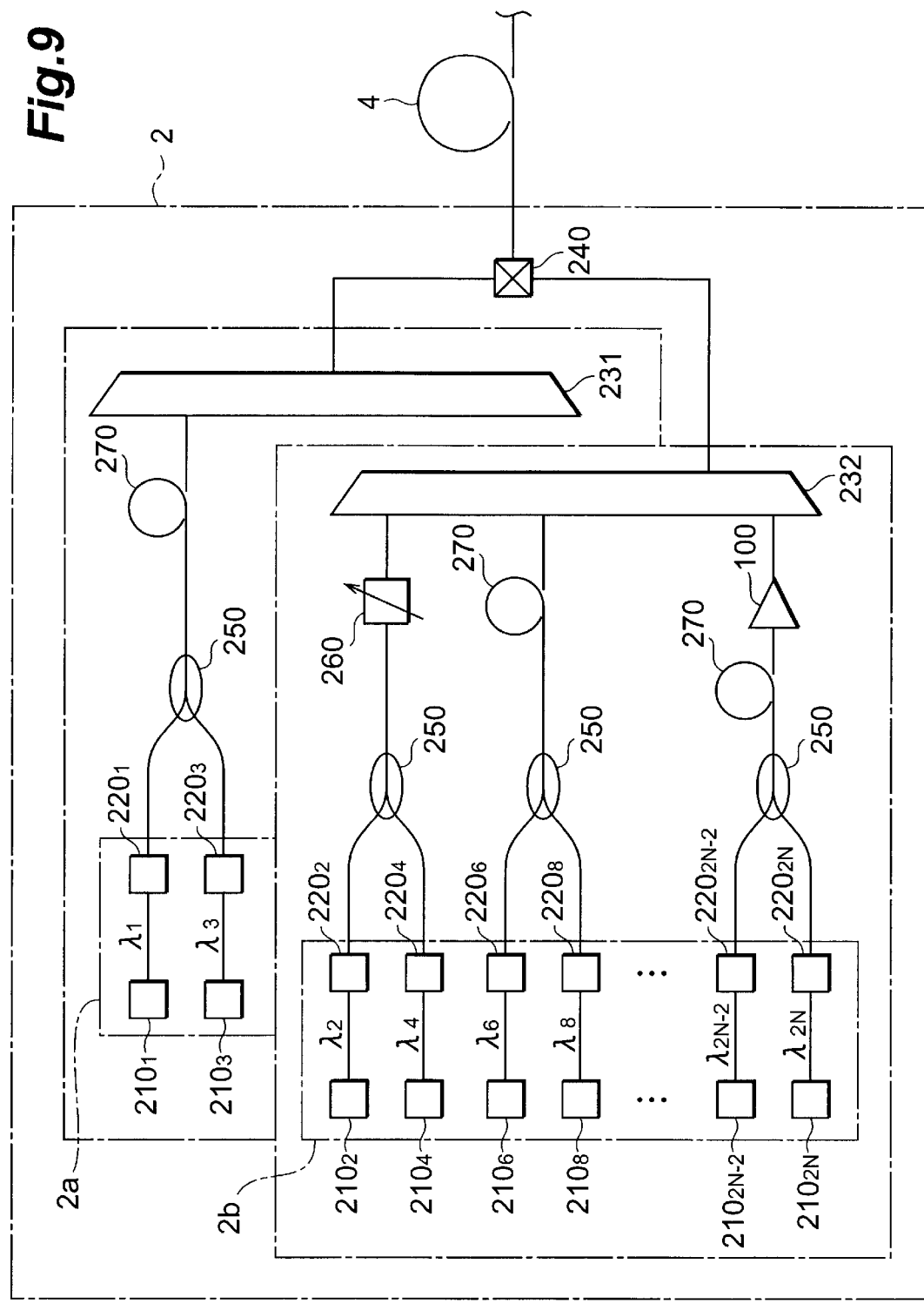
FIG. 9 is a block diagram showing part of the structure (mainly the structure of an optical transmitter) of the second embodiment of an optical communication system according to the present invention.

FIG. 9 is a block diagram mainly showing the structure of the optical transmitter 2 as the structure of the second embodiment of an optical communication system 1 according to the present invention. In the optical communication system 1 according to the second embodiment, the optical transmitter 2 and optical receiver 3 are optically connected by an optical fiber transmission path 4, as in the above-described first embodiment. A relay device may be arranged on the optical fiber transmission path 4. The optical transmitter 2 comprises 2N (N is a positive integer) light sources $210_1$ to $210_{2N}$, 2N optical polarization controllers $220_1$ to $220_{2N}$, multiplexers 231 and 232, optical polarization synthesizer 240, and EDFA 100 having the above-described structure. Signal channels output from the optical transmitter 2 are sequentially alternately assigned to first and second light source systems 2a and 2b such that the polarized state alternately changes from the short wavelength side to the long wavelength side. The arrangement of the optical receiver 3 in the second embodiment is the same as in the first embodiment.

Each light source $210^k$ (k is an arbitrary integer; $1 \leq k \leq 2N$) outputs signals having a wavelength $\lambda_k$. Wavelengths $\lambda_1$ to $\lambda_{2N}$ belong to the L band and hold a relationship $\lambda_1 < \lambda_2 < \ldots < \lambda_{2n-1} < \lambda_{2n} < \ldots < \lambda_{2N}$. As each light source $210_k$, a DFB-LD is preferably used. Each optical polarization controller $220_1$ outputs signals output from a corresponding $210_k$ as linearly polarized light. The multiplexer 231 multiplexes the signals output from the optical polarization controllers $220_1$, $220_3$, ..., $220_{2n-1}$, ..., and $220_{2N-1}$ and outputs the multiplexed signals to the optical polarization synthesizer 240. The multiplexer 232 multiplexes the signals output from the optical polarization controllers $220_2$, $220_4$, ..., $220_{2n}$, ..., and $220_{2N}$ and outputs the multiplexed signals to the optical polarization synthesizer 240.

In this embodiment, the light sources $210_1$ to $210_{2N}$ for outputting the signal wavelengths $\lambda_1$ to $\lambda_{2N}$ are sequentially numbered from in ascending order of signal wavelength to be output and divided into the first light source system 2a including the odd-numbered light sources $210_1$, $210_3$, ..., $210_{2n-1}$, ..., and $210_{2N-1}$ and optical polarization controllers $220_1$, $220_3$, ..., $220_{2n-1}$, ..., and $220_{2N-1}$ and the second light source system 2b including the even-numbered light sources $210_2$, $210_4$, ..., $210_{2n}$, ..., and $210_{2N}$ and optical polarization controllers $220_2$, $220_4$, ..., $220_{2n}$, ..., and $220_{2N}$. The system is designed to make the polarized states of the signals output from the first and second light source systems 2a and 2b orthogonal. Hence, the plane of polarization of the signals ($\lambda_1$, $\lambda_3$, ..., $\lambda_{2n-1}$, ..., $\lambda_{N-1}$) output from the multiplexer 231 to the optical polarization synthesizer 240 and the plane of polarization of the signals ($\lambda_2$, $\lambda_3$, ..., $\lambda_{2n}$, ..., $\lambda_N$) output from the multiplexer 232 to the optical polarization synthesizer 240 are orthogonal.

In the second embodiment, to execute chromatic dispersion for the plurality of channels, couplers 250 and dispersion compensation fibers 270 each serving as a dispersion compensator are inserted between the second light source system 2b and the multiplexer 232, as shown in FIG. 9. In the second embodiment, the above-described EDFAs 100 and variable attenuators 260 are also provided to uniform the signal levels between the respective signal channels. Although the above description is related to the second light source system 2b, the first light source system 2a side also has the same arrangement as described above. Hence, for the signals output from the multiplexer 231, the signal levels are uniformed between the signal channels, and for the signals output from the multiplexer 232 as well, the signal levels are uniformed between the signal channels.

The optical polarization synthesizer 240 multiplexes the signals ($\lambda_1$, $\lambda_3$, ..., $\lambda_{2n-1}$, ..., $\lambda_{N-1}$) output from the multiplexer 231 and the signals ($\lambda_2$, $\lambda_3$, ..., $\lambda_{2n}$, ..., $\lambda_N$) output from the multiplexer 232 and outputs the multiplexed signals of 2N channels to the optical fiber transmission path 4. Even at the time of output from the optical polarization synthesizer 240, the plane of polarization of the signals ($\lambda_1$, $\lambda_3$, ..., $\lambda_{2n-1}$, ..., $\lambda_{N-1}$)and the plane of polarization of the signals ($\lambda_2$, $\lambda_3$, ..., $\lambda_{2n}$, ..., $\lambda_N$) are orthogonal.

The optical communication system 1 according to the second embodiment operates in the following way. In the optical transmitter 2, the signals having the wavelength $\lambda_1$ output from the light source $210_k$ are converted into linearly polarized light by the optical polarization controller $220_k$. The signals ($\lambda_1$, $\lambda_3$, ..., $\lambda_{2n-1}$, ..., $\lambda_{N-1}$) output from the optical polarization controllers $220_1$, $220_3$, ..., $220_{2n-1}$, ..., and $220_{2N-1}$ included in the first light source system 2a are multiplexed by the multiplexer 231 after the signal levels between the signal channels are uniformed by the EDFAs 100 and variable attenuators 260. On the other hand, the signals ($\lambda_2$, $\lambda_3$, ..., $\lambda_{2n}$, ..., $\lambda_N$) output from the optical polarization controllers $220_2$, $220_4$, ..., $220_{2n}$, ..., and $220_{2N}$ included in the second light source system 2b are also multiplexed by the multiplexer 232 after the signal levels between the signal channels are uniformed by the EDFAs 100 and variable attenuators 260. These signals ($\lambda_1$ to $\lambda_{2N}$) of 2N channels are further multiplexed by the optical polarization synthesizer 240 and output to the optical fiber transmission path 4.

In the optical communication system 1 according to the second embodiment, the operation on the optical receiver 3 side is the same as in the above-described first embodiment.

As has been described above, the amplification optical fiber according to the present invention has a polarization maintaining structure for maintaining the polarized state of signals propagating and also a structure in which Er and Al at a concentration of 4 wt % or more are doped into the core region included in the light propagation region. With this structure, signals can be amplified while maintaining the polarized state, and a flat gain spectrum and high polarization extinction ratio can be obtained without using a gain equalizer. Since this amplification optical fiber requires no gain equalizer, the manufacturing cost can be reduced.

The cutoff wavelength of the amplification optical fiber according to the present invention is preferably 1.15 $\mu$m or more, and a fiber optic amplifier including the amplification optical fiber preferably amplifies signals with a wavelength included in the L band. In this case, even when the amplification optical fiber is wound in a coil shape and accommodated, the bending loss of the amplification optical fiber falls within the allowable range. Hence, even when the amplification optical fiber becomes long to amplify L-band signals, any increase in bending loss can be effectively suppressed, and the amplification optical fiber can be accommodated in a small space.

According to the optical transmitter and the optical communication system including the optical transmitter of the present invention, WDM signals of a plurality of channels with different wavelengths are output from the light source system such that the polarized state of the signal channels alternately changes from the short wavelength side to the long wavelength side. Since planes of polarization of the WDM signals are set to be orthogonal to each other alternately from the short wavelength side to the long wavelength side, any nonlinear optical phenomenon that may occur when the WDM signals propagate through the optical fiber transmission path can be effectively suppressed, the wave spacing between the signal channels can be reduced, and the signal transmission amount can be increased. In addition, since the WDM signals are amplified by the fiber optic amplifier with a flat gain spectrum and high polarization extinction ratio, the wave spacing between signal channels can also be reduced in respect to this point, and the signal transmission amount can be further increased.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A silica-based amplification optical fiber for amplifying signals upon receiving pumping light, comprising:
   a light propagation region through which the signals propagate and which is at least partially doped with erbium and aluminum of 4 wt % or more; and
   a polarization maintaining structure for maintaining a polarized state of the signals.

2. An amplification optical fiber according to claim 1, wherein a cutoff wavelength of said amplification optical fiber is 1.15 $\mu$m or more.

3. A fiber optic amplifier, comprising:
   said amplification optical fiber according to claim 1; and
   a pumping light source for supplying pumping light with a predetermined wavelength to said amplification optical fiber.

4. A fiber optic amplifier according to claim 3, wherein signals having predetermined wavelengths included in a wavelength band of 1,570 to 1,600 nm are amplified.

5. A fiber optic amplifier according to claim 3, wherein a polarization extinction ratio of said fiber optic amplifier at a wavelength of 1.60 $\mu$m is 20 dB or more.

6. A fiber optic amplifier according to claim 5, wherein the polarization extinction ratio of said fiber optic amplifier at a wavelength of 1.60 $\mu$m is 25 dB or more.

7. An optical transmitter, comprising:
   a first light source system for outputting signals of a plurality of channels with different wavelengths, each signal being set in a first polarized state;
   a second light source system for outputting signals of a plurality of channels with wavelengths different from those of the signals output from said first light source system, each signal being set in a second polarized state different from the first polarized state; and
   said fiber optic amplifier according to claim 3, which amplifies the signals output from said first and second light source systems.

8. An optical transmitter according to claim 7, wherein the signal channels to be output from said optical transmitter are sequentially alternately assigned to said first and second light source systems to alternately change the polarized state from a short wavelength side to a long wavelength side.

9. An optical communication system comprising said optical transmitter according to claim 7.

10. An optical transmitter, comprising:
    a first light source system for outputting signals of a plurality of channels with different wavelengths, each signal being set in a first polarized state;
    a second light source system for outputting signals of a plurality of channels with wavelengths different from those of the signals output from said first light source system, each signal being set in a second polarized state different from the first polarized state;
    a multiplexer for multiplexing the signals in the first polarized state, which are output from said first light source system, and the signals in the second polarized state, which are output from said second light source system; and
    one or more optical amplifiers, each having the same structure as that of said fiber optic amplifier according to claim 3 and inserted between said first light source system and said multiplexer to amplify, of the signals output from said first light source system, signals of a corresponding channel.

11. An optical transmitter according to claim 10, wherein the signal channels to be output from said optical transmitter are sequentially alternately assigned to said first and second light source systems to alternately change the polarized state from a short wavelength side to a long wavelength side.

12. An optical communication system comprising said optical transmitter according to claim 10.

* * * * *